(12) United States Patent
Colliou et al.

(10) Patent No.: US 10,704,476 B2
(45) Date of Patent: Jul. 7, 2020

(54) DEVICE AND METHOD FOR CONTROLLING THE INJECTION OF AIR AND EXHAUST GAS AT THE INTAKE OF A SUPERCHARGED INTERNAL-COMBUSTION ENGINE

(71) Applicant: IFP Energies Nouvelles, Rueil-Malmaison (FR)

(72) Inventors: Thierry Colliou, Les Cotes d'Arey (FR); Bruno Walter, Chagnon (FR); Stephane Venturi, Roiffieux (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 16/308,903

(22) PCT Filed: Jun. 27, 2017

(86) PCT No.: PCT/EP2017/065832
§ 371 (c)(1),
(2) Date: Dec. 11, 2018

(87) PCT Pub. No.: WO2018/002037
PCT Pub. Date: Jan. 4, 2018

(65) Prior Publication Data
US 2019/0136772 A1 May 9, 2019

(30) Foreign Application Priority Data

Jun. 30, 2016 (FR) ...................... 16 56168

(51) Int. Cl.
*F02D 41/00* (2006.01)
*F02B 37/16* (2006.01)
(Continued)

(52) U.S. Cl.
CPC ........ *F02D 41/0007* (2013.01); *F02B 37/168* (2013.01); *F02D 21/08* (2013.01);
(Continued)

(58) Field of Classification Search
CPC ...... F02D 41/0007; F02D 23/02; F02D 21/08; F02D 41/0065; F02M 26/36; F02M 26/05; F02B 37/168; Y02T 10/47; Y02T 10/144
(Continued)

(56) References Cited

U.S. PATENT DOCUMENTS 4,215,550 A 8/1980 Dinger et al.
4,404,805 A 9/1983 Curtil
(Continued)

FOREIGN PATENT DOCUMENTS

AT 2540 U1 12/1998
DE 10127392 A1 3/2002
(Continued)

OTHER PUBLICATIONS

International Search Report for PCT/EP2017/065832, dated Aug. 25, 2017; English translation submitted herewith (6 pgs.).

*Primary Examiner* — Hoang M Nguyen
(74) *Attorney, Agent, or Firm* — Fitch, Even, Tabin & Flannery, LLP

(57) ABSTRACT

The present invention relates to a device for controlling the amount of air fed to the intake of a turbocharged internal-combustion engine comprising a turbocharging system including a turbocharger (7) with a turbine (8) connected to at least one exhaust gas outlet of said engine, as well as an outside air compressor (10), a line (15, 18) for partial transfer of the compressed air from the compressor to the turbine inlet, and an EGR line (18, 21) between an exhaust gas outlet and a compressed air intake line (4). The device (Continued)

is characterized in that the partial transfer line and the EGR line share at least one common portion (18).

8 Claims, 2 Drawing Sheets

(51) Int. Cl.
  *F02D 21/08* (2006.01)
  *F02D 23/02* (2006.01)
  *F02M 26/05* (2016.01)
  *F02M 26/36* (2016.01)
(52) U.S. Cl.
  CPC ......... *F02D 23/02* (2013.01); *F02D 41/0065* (2013.01); *F02M 26/05* (2016.02); *F02M 26/36* (2016.02); *Y02T 10/144* (2013.01); *Y02T 10/47* (2013.01)
(58) Field of Classification Search
  USPC ............................... 60/600, 604, 605.2, 611
  See application file for complete search history.

(56) References Cited

U.S. PATENT DOCUMENTS

| | | | | |
|---|---|---|---|---|
| 8,096,125 | B2* | 1/2012 | Hepburn | F01N 3/021 60/605.2 |
| 2011/0131980 | A1* | 6/2011 | Boyer | F01C 21/106 60/605.2 |
| 2014/0157774 | A1* | 6/2014 | McConville | F02B 37/164 60/611 |
| 2014/0196454 | A1* | 7/2014 | Ulrey | F01N 3/10 60/605.2 |
| 2015/0047342 | A1* | 2/2015 | McConville | F02B 47/08 60/600 |
| 2018/0066610 | A1* | 3/2018 | Roth | F02M 26/08 |

FOREIGN PATENT DOCUMENTS

| | | |
|---|---|---|
| EP | 1138928 A2 | 10/2001 |
| FR | 2478736 A1 | 9/1981 |
| FR | 2900198 A1 | 10/2007 |

* cited by examiner

DEVICE AND METHOD FOR CONTROLLING THE INJECTION OF AIR AND EXHAUST GAS AT THE INTAKE OF A SUPERCHARGED INTERNAL-COMBUSTION ENGINE

CROSS-REFERENCE TO RELATED APPLICATIONS

This application is a U.S. national phase application filed under 35 U.S.C. § 371 of International Application No. PCT/EP2017/065832, filed Jun. 27, 2017, designating the United States, which claims priority from French Patent Application No. 16/56.168, filed Jun. 30, 2016, which are hereby incorporated herein by reference in their entirety.

FIELD OF THE INVENTION

The present invention relates to architectures and to a device for controlling a device feeding an amount of air to the intake of a turbocharged internal-combustion engine, notably a stationary engine or an automotive or industrial vehicle engine.

In particular, the present invention is suited for engines, notably diesel engines, equipped with an exhaust gas recirculation circuit.

BACKGROUND OF THE INVENTION

As it is widely known, the power delivered by an internal-combustion engine depends on the amount of air fed to the combustion chamber of this engine, which amount of air is itself proportional to the density of this air.

Thus, it is usual to increase this amount of air through compression of the outside air before it is allowed into the combustion chamber. This operation, known as turbocharging, can be carried out using any means such as a turbocharger or a driven compressor, which can be a centrifugal or a positive-displacement compressor.

The turbocharger used for turbocharging comprises a rotary single-flow or double-flow turbine connected by a shaft to a rotary compressor. The exhaust gases from the engine flow through the turbine, which is then rotated. This rotation is thereafter transmitted to the compressor which, by its rotation, compresses the outside air before it is fed to the combustion chamber.

As is better described in French patent application No. 2,478,736, it is intended to increase the compression of the outside air by the compressor even further so as to be able to significantly amplify this amount of compressed air in the compression chamber of the engine.

This is achieved more particularly by increasing the rotational speed of the turbine and therefore of the compressor.

A fluid amplifier circuit, referred to as boost circuit, is therefore used, by means of which part of the compressed air exiting the compressor is diverted in order to be directly allowed to the turbine inlet while mixing with the exhaust gases. This turbine is then traversed by a larger amount of fluid (mixture of compressed air and exhaust gas), which allows the rotational speed of the turbine, and therefore of the compressor, to be increased. This compressor speed increase thus allows to raise the pressure of the outside air that is compressed in this compressor prior to being fed to the combustion chamber of the engine.

Thus, the compressed air has a higher density, which allows the amount of air contained in the combustion chamber to be increased.

This type of turbocharged engine, although satisfactory, however involves some not insignificant drawbacks.

Indeed, the flow of compressed air admitted at the turbine inlet is not correctly controlled, which may lead to dysfunctional engines.

Thus, by way of example, in case of too large amounts of compressed air diverted to the turbine inlet, the exhaust gases entering the turbine are cooled too much by this air, which causes a decrease in the overall turbocharging efficiency.

Furthermore, one of the major difficulties with the present turbocharging concept including a boost circuit lies in the compatibility thereof with exhaust gas recirculation. Indeed, most diesel engines are equipped with an exhaust gas recirculation circuit, referred to as EGR circuit, for limiting NOx emissions at source.

Exhaust gas recirculation is generally achieved by means of a HP EGR (High-Pressure Exhaust Gas Recirculation) circuit withdrawing the exhaust gas upstream from the turbine and sending it downstream from the intake air compressor. The recirculated exhaust gas circulating strictly in the opposite direction to the air diverted from the boost circuit, there is a likelihood of conflict between the two circuits, with the effects cancelling each other out. It is thus necessary to define a specific air loop architecture allowing the boost circuit and the HP EGR circuit to be made compatible.

Document EP-1,138,928 describes an EGR circuit and a boost circuit distinct in all respects, which requires complex construction and controls.

On the other hand, the present invention relates to an optimized air loop and exhaust gas recirculation architecture enabling to use, in a single engine, a HP EGR or a boost circuit, while avoiding too great a complexity for the respective lines and controls.

SUMMARY OF THE INVENTION

The present invention thus relates to a device for controlling the amount of air fed to the intake of a turbocharged internal-combustion engine comprising a turbocharging system including a turbocharger with a turbine connected to at least one exhaust gas outlet of said engine, as well as an outside air compressor, a line for partial transfer of the compressed air from the compressor to the turbine inlet, and an exhaust gas recirculation line between an exhaust gas outlet and a compressed air intake line, characterized in that said partial transfer line and said exhaust gas recirculation line share at least one common portion.

The device can comprise a controlled throttling system on the partial compressed air transfer circuit and on the EGR circuit for controlling the exhaust gas recirculation or the partial compressed air transfer to turbine (8).

The throttling system can include at least one valve on the exhaust gas recirculation circuit EGR and a valve on the partial transfer line.

The partial transfer line can be connected either upstream or downstream from a heat exchanger on the compressed air line.

The throttling system can comprise at least one three-way valve.

The partial transfer line can comprise an exchanger for the exhaust gas recirculation.

The present invention also relates to a method for controlling the amount of air fed to the intake of a turbocharged internal-combustion engine comprising a turbocharging system including a turbocharger with a turbine connected to at least one exhaust gas outlet of said engine, as well as an outside air compressor, a line for partial transfer of the compressed air from the compressor to the turbine inlet, and an exhaust gas recirculation line between an exhaust gas outlet and a compressed air intake line, characterized in that a shared line portion is used for said partial transfer line and said exhaust gas recirculation line.

A throttling system can be controlled so as to achieve either exhaust gas recirculation, or partial compressed air transfer.

BRIEF DESCRIPTION OF THE FIGURES

Other features and advantages of the invention will be clear from reading the description hereafter, given by way of non limitative example, with reference to the accompanying figures wherein.

DETAILED DESCRIPTION OF THE INVENTION

Figure 1:
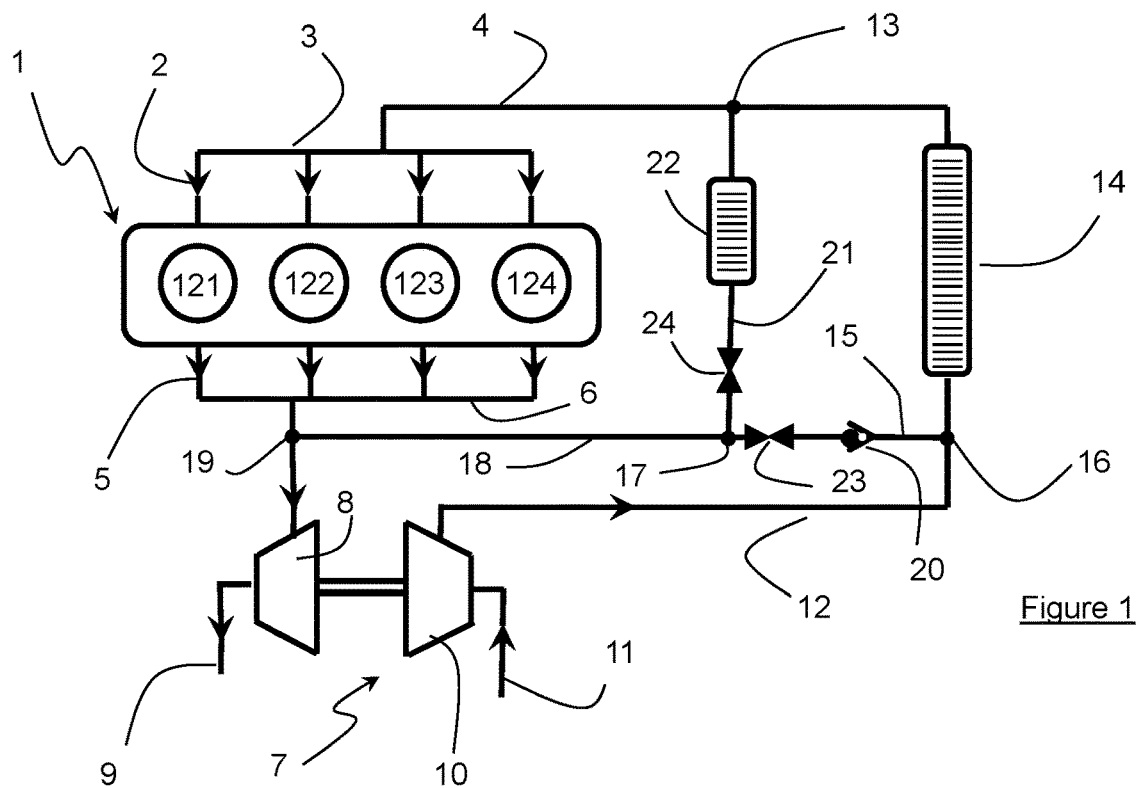
FIG. 1 illustrates an internal-combustion engine with its turbocharging device and its HP EGR circuit used according to the invention.

In FIG. 1, internal-combustion engine 1 comprises at least two cylinders, here four cylinders with reference numerals 121 to 124 from the left of the figure.

Preferably, this engine is a direct-injection internal-combustion engine, notably of diesel type, which by no means excludes any other type of internal-combustion engine.

Each cylinder comprises intake means with at least one intake valve controlling an intake pipe 2. The intake pipes lead to an intake manifold 3 supplied with intake air, such as compressed air, through a supply line 4.

This cylinder also comprises burnt gas exhaust means with at least one exhaust valve controlling an exhaust pipe 5 leading to an exhaust manifold 6.

Exhaust manifold 6 leads to a turbocharger 7 used for air compression, and more specifically to the expansion turbine 8 of this turbocharger.

As illustrated in FIG. 1, the turbocharger is a single-scroll turbocharger.

The invention is not limited to a single-scroll turbocharger, it is also applicable to twin-scroll turbochargers, or even to turbochargers with n inlets, n being greater than or equal to 2.

Gas outlet 9 of turbine 8 is conventionally connected to an exhaust line of the engine.

Compressor 10 of turbocharger 7 comprises an outside air intake 11 supplied by a supply line. The compressed air outlet of this compressor is connected to supply line 4 of intake manifold 3 by a line 12. The junction point between lines 4 and 12 is denoted by 13.

Advantageously, a compressed air cooling exchanger 14 may be provided on line 12, between compressor 10 and line 4.

As is better seen in FIG. 1, a transfer line 15 allows circulation of part of the compressed air from compressor 10 towards the inlet of turbine 8.

More precisely, this partial transfer line originates from line 12, at an intersection point 16 between the compressor and cooling exchanger 14, and it connects, from a bifurcation point 17, with a branch 18. Branch 18 leads to the turbine inlet through its junction, at point 19, with exhaust gas outlet 6.

A line 21 connects branch 18 to intake line 4. It preferably runs through an exchanger 22 suited for cooling the exhaust gases.

Lines 15 and 21 are respectively equipped with valves 23 and 24, preferably proportional valves.

Branch 15 also comprises a non-return valve 20, which prevents circulation of the fluids from branches 18 and/or 21 to compressor 10.

This configuration thus allows, during operation of the engine, to take advantage of the exhaust low-pressure zones occasionally prevailing in the exhaust manifold in order to feed compressed air into the turbine and thus to increase the flow rate of this turbine, and therefore of the compressor. This also allows to achieve more efficient turbocharging at low engine speeds, and notably to manage transient phases with suitable control strategies for the proportional valves.

During operation, in case a large amount of air is required in the cylinders, opening of valve 23 is controlled so as to feed compressed air from compressor 10 into turbine 8, and closing of valve 24 is controlled concurrently.

The compressed air exiting compressor 10 circulates in line 15, then in branch 18 prior to reaching the exhaust gas inlet of turbine 8, thus providing surplus fluid supply to this turbine.

Thus, the turbine is traversed not only by the exhaust gases from manifold 5, but also by compressed air that comes on top of these gases. Therefore, the rotation of the turbine is increased, which causes an increase in the rotation of the compressor and, consequently, an increase in the pressure of the compressed air exiting this compressor.

In this configuration, the compressed air of line 15 does not flow through exchanger 14, and the engine runs without EGR since valve 24 is closed.

In order to operate with exhaust gas recirculation EGR so as to limit combustion temperatures and therefore NOx emissions, valve 23 is closed and valve 24 is open. A portion of the exhaust gases is fed into intake line 4 through branches 18 and 21 after passing through exchanger 22. This operates when the average pressure at the exhaust is greater than the average pressure at the intake.

It can be noted that valves 23 and 24 may be replaced with a three-way valve whose function is equivalent for controlling the various streams.

Furthermore, it is clear that valve 24 (referred to as EGR valve) can be arranged upstream (FIG. 1) or downstream (not shown) from heat exchanger 22.

Thus, in the present invention, at least a portion of a line communicating, on the one hand, with the inlet of turbine 8 and, on the other, with the compressed air supply, is used. This line portion allows passage of exhaust gas when EGR valve 24 is open and valve 23 is closed. Also, it allows passage of compressed air when valve 23 is open and EGR valve 24 is closed.

An optimized architecture in terms of lines is thus obtained.

Figure 2:
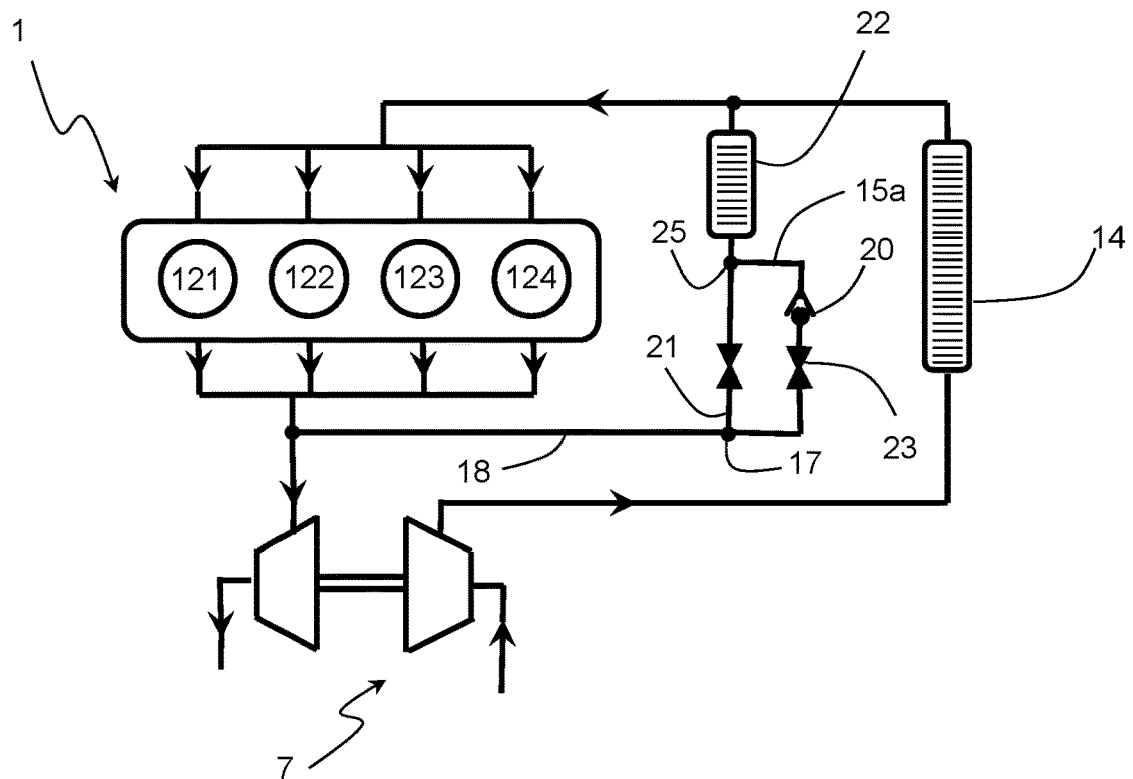
FIG. 2 shows a variant of the internal-combustion engine according to the invention.

The variant of FIG. 2 differs from FIG. 1 in that a connecting line 15a is provided between two junction points 17 and 25 with line 21. This connecting line is provided with throttling means 23, such as a proportional valve, and with a non-return valve 20.

According to this variant, the compressed air of the boost circuit flows through exchanger 14, then through exchanger 22 of the EGR circuit, connecting line 15a and branch 18. One of the advantages thereof lies in that the counter-current circulation of the air of the boost circuit in exchanger 22 of the EGR circuit enables scrubbing and/or declogging thereof.

Figure 3:
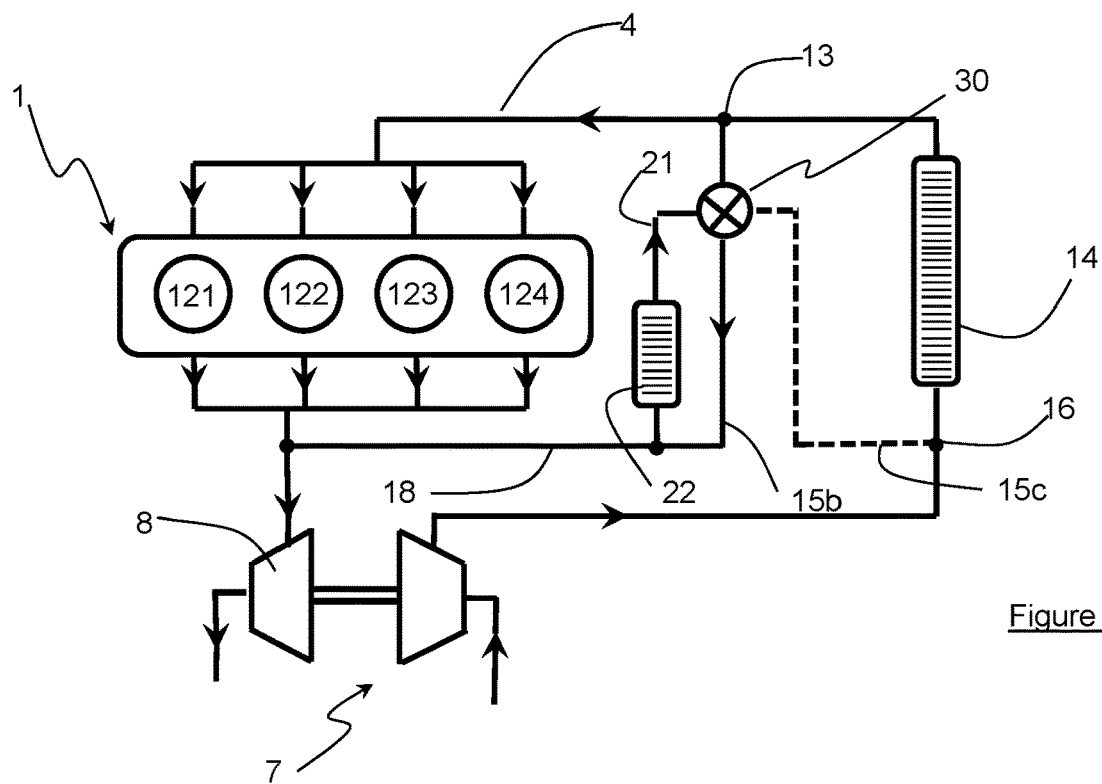
FIGS. 3 and 4 illustrate other variants of the internal-combustion engine according to the invention.
Figure 4:
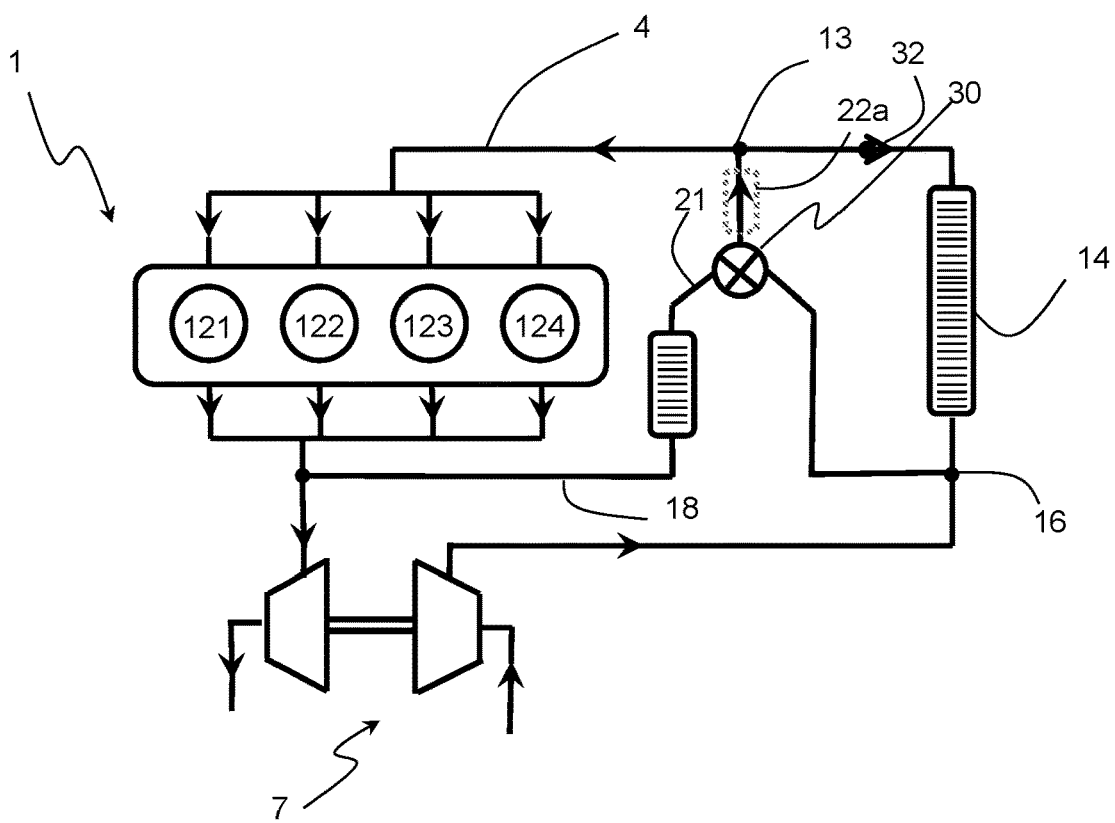

FIGS. 3 and 4, which essentially comprise the same elements as FIG. 1, describe variants of the arrangement according to the invention using a ball valve type throttling element 30 including a valve box for fulfilling the various circulation functions, whether in EGR or boost mode. It is within the reach of the person skilled in the art to select the suitable components.

More precisely, in FIG. 3, a valve 30, a three-way ball valve for example, is interposed downstream from EGR exchanger 22 on EGR line 21. Controlling this valve 30 allows passage of exhaust gas towards compressed air intake line 4 through junction point 13. A line 15b connecting valve 30 to branch 18 is then closed.

The other position of valve 30 allows passage of a compressed air portion through line 15b towards branch 18 for boosting turbine 8. Thus, the boost air flows through exchanger 14 without passing through EGR exchanger 22.

A variant represented by line 15c in dotted line in FIG. 3 shows valve 30 connected to junction point 16 upstream from compressed air exchanger 14. Valve 30 is not connected to junction point 13 here. The air of the boost circuit is here directly sent to turbine 8. On the other hand, the exhaust gas of the EGR circuit passes through exchangers 22 and 14, and reaches junction point 16 of the compressed air line.

FIG. 4 describes another variant where valve 30 is connected to junction point 13 for leading the fluids flowing therethrough to compressed air intake line 4. This three-way valve is supplied with air from the boost circuit through a line connected to junction point 16 upstream from exchanger 14, and with EGR exhaust gas through branch 18. Thus, the shared EGR and boost line comprises branch 18 and the EGR exchanger. It can be noted, as shown by reference 22a, that the EGR exchanger can be arranged downstream from valve 30 before junction point 13. A non-return valve 32 can be provided downstream from exchanger 14 so as to block the exhaust gas when the EGR circuit is operating.

According to the invention described by way of example in FIGS. 1 to 4, at least a portion of the EGR line, generally integrated in the exhaust manifold, but it can also be integrated in the cylinder head, is used to send a compressed air portion to the turbine inlet in order to obtain a boost circuit.

The invention claimed is:

1. A device for controlling the amount of air fed to the intake of a turbocharged internal-combustion engine comprising:

a turbocharging system including a turbocharger with a turbine connected to at least one exhaust gas outlet of the engine, and an outside air compressor, a partial compressed air transfer line for partial transfer of compressed air from the outside air compressor to an inlet of the turbine, an exhaust gas recirculation line between an exhaust gas outlet of the internal-combustion engine and a compressed air intake line of the internal-combustion engine, and a controlled throttling system for controlling the exhaust gas recirculation or the partial compressed air transfer to the turbine inlet comprising a proportional valve on the exhaust gas recirculation line and a proportional valve on the partial compressed air transfer line, wherein the partial compressed air transfer line and the exhaust gas recirculation line share at least one common portion.

2. A device as claimed in claim 1, wherein the partial compressed air transfer line is connected either upstream or downstream from a heat exchanger on the compressed air line.

3. A device as clamed in claim 1, wherein the partial compressed air transfer line comprises an exchanger for the exhaust gas recirculation.

4. A method for controlling the amount of air fed to the intake of a turbocharged internal-combustion engine comprising a turbocharging system including a turbocharger with a turbine connected to at least one exhaust gas outlet of the engine, and an outside air compressor, a partial compressed air line for partial transfer of compressed air from the compressor to an inlet of the turbine, an exhaust gas recirculation line between an exhaust gas outlet of the internal-combustion engine and a compressed air intake line of the internal-combustion engine, and a controlled throttling system for controlling the exhaust gas recirculation or the partial compressed air transfer to the turbine inlet comprising a proportional valve on the exhaust gas recirculation line and a proportional valve on the partial compressed air transfer line, wherein a shared line portion is used for the partial compressed air transfer line and the exhaust gas recirculation line.

5. Application of the device as claimed in claim 1 to a diesel engine.

6. Application of the method as claimed in claim 4 to a diesel engine.

7. A diesel engine comprising the device for controlling the amount of air fed to the intake as claimed in claim 1.

8. A method as claimed in claim 4, wherein the turbocharged internal-combustion engine is a diesel engine.

* * * * *